(12) United States Patent
Sheng et al.

(10) Patent No.: US 10,193,452 B2
(45) Date of Patent: Jan. 29, 2019

(54) TWO STAGE STRUCTURE FOR POWER DELIVERY ADAPTER

(71) Applicant: GOOGLE LLC, Mountain View, CA (US)

(72) Inventors: Honggang Sheng, Milpitas, CA (US); Choon Ping Chng, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/853,338

(22) Filed: Dec. 22, 2017

(65) Prior Publication Data

US 2018/0123463 A1    May 3, 2018

Related U.S. Application Data

(63) Continuation of application No. 14/970,481, filed on Dec. 15, 2015, now Pat. No. 9,899,925.

(51) Int. Cl.
*H02M 3/335* (2006.01)
*H02M 1/42* (2007.01)
(Continued)

(52) U.S. Cl.
CPC ..... *H02M 3/33507* (2013.01); *H02M 1/4258* (2013.01); *H02M 3/158* (2013.01);
(Continued)

(58) Field of Classification Search
CPC .... H02M 3/1588; H02M 3/156; H02M 3/157; H02M 3/3376; H02M 3/33507; G05F 1/648; H02J 1/102; H01R 13/6675
(Continued)

(56) References Cited

U.S. PATENT DOCUMENTS 7,294,994 B2    11/2007  Ryu et al.
8,004,114 B2    8/2011   Lee et al.
(Continued)

FOREIGN PATENT DOCUMENTS

CN    201528218 U    7/2010
EP    2451067 A2     5/2012
(Continued)

OTHER PUBLICATIONS

International Preliminary Report on Patentability from PCT Application No. PCT/US2016/063375, dated Dec. 1, 2017; 19 pages.
(Continued)

*Primary Examiner* — Nguyen Tran
(74) *Attorney, Agent, or Firm* — Brake Hughes Bellermann LLP

(57) ABSTRACT

In one general aspect, a system can include an electromagnetic interference (EMI) filter, an alternating current (AC) rectifier bridge operatively coupled to the electromagnetic filter, the AC rectifier bridge providing a first voltage, a first power stage including a step-down transformer, the first power stage configured to receive the first voltage and output a second voltage, a second power stage configured to receive the second voltage and configured to convert the second voltage to a third voltage, and a power delivery adapter controller configured to receive at least one input indicative of a requested voltage value and configured to provide at least one output for use by the second power stage, the second power stage configured to determine a value for the third voltage based on the at least one output.

17 Claims, 7 Drawing Sheets

(51) Int. Cl.
    H02M 3/158      (2006.01)
    H02M 1/00       (2006.01)
    H02M 1/44       (2007.01)
(52) U.S. Cl.
    CPC .......... *H02M 3/33576* (2013.01); *H02M 1/44* (2013.01); *H02M 2001/007* (2013.01)
(58) Field of Classification Search
    USPC ........ 323/271, 282–285, 298; 363/17, 21.12, 363/65, 146
    See application file for complete search history.

(56) References Cited

U.S. PATENT DOCUMENTS

| | | |
|---|---|---|
| 8,907,646 B2 | 12/2014 | Lee et al. |
| 2002/0044468 A1 | 4/2002 | Goodarzi et al. |
| 2008/0273355 A1 | 11/2008 | Yos et al. |
| 2009/0290385 A1 | 11/2009 | Jungreis et al. |
| 2010/0165668 A1 | 7/2010 | Lin |
| 2012/0313538 A1 | 12/2012 | Kumar et al. |
| 2014/0218974 A1 | 8/2014 | Chang |
| 2015/0263630 A1 | 9/2015 | Naka et al. |
| 2016/0036328 A1 | 2/2016 | Noh et al. |

FOREIGN PATENT DOCUMENTS

| | | |
|---|---|---|
| EP | 2887492 A2 | 6/2015 |
| WO | 2015/179027 A1 | 11/2015 |
| WO | 2015179027 A1 | 11/2015 |

OTHER PUBLICATIONS

"Buck Converter", https://en.wikipedia.org/wiki/Buck_converter, Oct. 19, 2015, 16 pages.
Caceres, et al., "A High Performance Uninterruptible Power Supply System with Power Factor Correction", IEEE, 1997, 6 pages.
Li, Heng-Yi, et al., "Analysis and Design of a Single-Stage Parallel AC-to-DC Converter", IEEE Transactions on Power Electronics, vol. 24, No. 12, Dec. 2009, 14 pages.
International Search Report and Written Opinion from PCT/US2016/63375, dated Mar. 6, 2017, 13 pages.
International Preliminary Report on Patentability from PCT/US2016/63375, dated Dec. 1, 2017, 19 pages.
Petersen, et al., "Two-Stage Power Factor Corrected Power Supplies: The Low Component-Stress Approach", Department of Electrical Engineering Technical University of Denmark, IEEE 2002, 7 pages.
Rahimi, et al., "Compensator Design Procedure for Buck Converter with Voltage-Mode Error-Amplifier", www.irf.com, 36 pages.
Safari, "Design of a DC/DC buck converter for ultra-low power applications in 65nm CMOS Process", Mar. 2012, 73 pages.

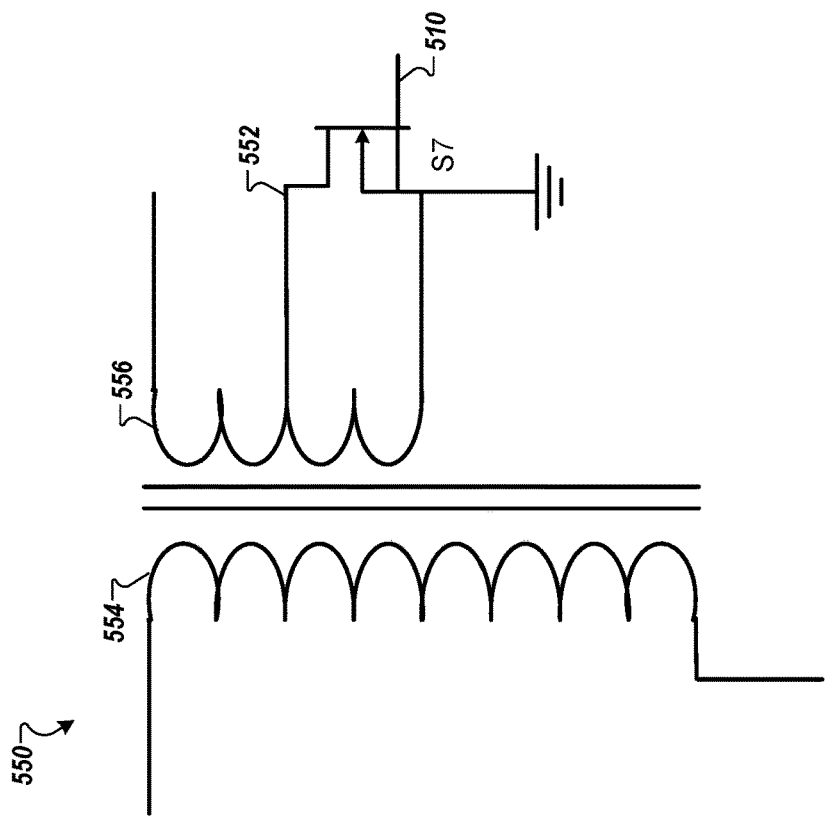
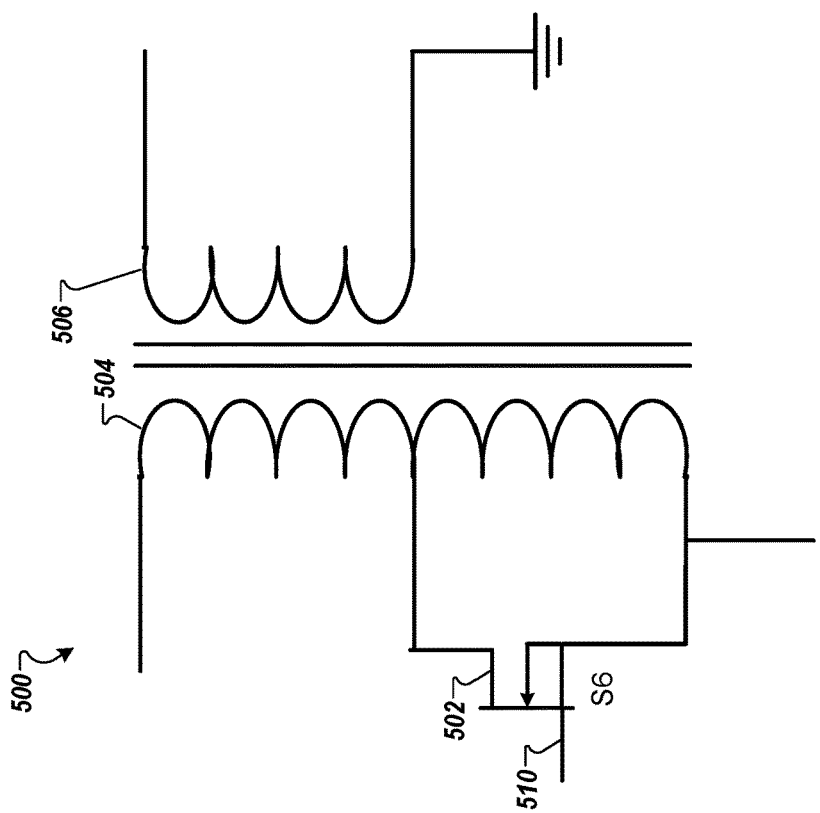
FIG. 5A
FIG. 5B

TWO STAGE STRUCTURE FOR POWER DELIVERY ADAPTER

CROSS-REFERENCE TO RELATED APPLICATION

This application is a continuation of and claims priority under 35 U.S.C. § 120 to U.S. application Ser. No. 14/970,481, filed on Dec. 15, 2015, and entitled "TWO STAGE STRUCTURE FOR POWER DELIVERY ADAPTER", the contents of which are hereby incorporated by reference.

TECHNICAL FIELD

This description generally relates to computing devices. The description, in particular, relates to the use of multi-function ports that deliver power on a computing device.

BACKGROUND

Electrical connectors can transmit data, signals, and/or power to and between electrical devices, such as computing devices. The computing devices may include portable computing devices such as laptop or notebook computers, tablets, netbooks, or smartphones. The computing devices may include desktop computers. In some cases, an external power source can provide power to a computing device. Cables can include connectors on both ends that can connect power and/or data between the electrical devices and between the external power source and the computing device.

In some cases, the external power supply can provide power to the computing device at one of many voltage levels (values). The computing device, using a communication protocol associated with the connectors, can provide data to the external power supply identifying a voltage for the power the external power supply can provide to the computing device.

SUMMARY

In one general aspect, a system can include an electromagnetic interference (EMI) filter, an alternating current (AC) rectifier bridge operatively coupled to the electromagnetic filter, the AC rectifier bridge providing a first voltage, a first power stage including a step-down transformer, the first power stage configured to receive the first voltage and output a second voltage, a second power stage configured to receive the second voltage and configured to convert the second voltage to a third voltage, and a power delivery adapter controller configured to receive at least one input indicative of a requested voltage value and configured to provide at least one output for use by the second power stage, the second power stage configured to determine a value for the third voltage based on the at least one output.

Example implementations may include one or more of the following features. For instance, an alternating current (AC) voltage can be input to the electromagnetic filter. The AC voltage can be provided by an AC power source. The step-down transformer can include a primary winding and a secondary winding. The primary winding can include a switch configured to control a number of windings on the primary winding. A control signal for the switch can enable the switch to control the number of windings on the primary winding based on a value for the AC voltage. The step-down transformer can include a primary winding and a secondary winding. The secondary winding can include a switch configured to control a number of windings on the primary winding. A control signal for the switch can enable the switch to control the number of windings on the secondary winding based on a value for the AC voltage. The first voltage can be a full-wave AC rectified voltage equal to a first voltage value. The second voltage can be a lower AC rectified voltage equal to a second voltage value that is less than the first voltage value. The second voltage value can be greater than the value for the third voltage. The step-down transformer can function as a safety isolation transformer. A first capacitor included on an input to the first power stage and a second capacitor included on an output of the first power stage can determine an amount of AC ripple on the second voltage. The system can further include a feedback control circuit used to provide a feedback control input to the second power stage. The at least one output for use by the second power stage can control a switch that switches a resistor in and out of the feedback control circuit. The second power stage can be configured to determine a value for the third voltage based on the feedback control input. The second power stage can be a buck converter. The second power stage can include a buck controller. The power delivery adapter controller can be configured to receive the at least one input indicative of a requested voltage value from a USB Type-C port.

In another general aspect, a method for providing an output voltage can include receiving an alternating current (AC) voltage from an AC power source, generating a first voltage based on the AC voltage, the first voltage being a full-wave rectified voltage, generating, by a first power stage, a second voltage based on the first voltage, the second voltage being a lower rectified voltage that is less than the first voltage, receiving, by a power delivery adapter controller, at least one input indicative of a requested voltage value, controlling, by the power delivery adapter controller, a feedback control signal based on the received at least one input indicative of the requested voltage value, receiving, by a second power stage, the second voltage and the feedback control signal, and generating, by the second power stage, an output voltage equal to the requested voltage value based on the received second voltage and the received feedback control signal.

Example implementations may include one or more of the following features. For instance, controlling a feedback control signal based on the received at least one input indicative of the requested voltage value can include controlling switching of a first switch and a second switch, the first switch switching a first resistor in and out of a feedback control circuit used to generate the feedback control signal, and the second switch switching a second resistor in and out of the feedback control circuit. The method can further include providing, by a USB Type-C port, the at least one input indicative of a requested voltage value. The USB Type-C port can implement a USB power delivery (PD) protocol. The controlling of the switching of the first switch and the second switch can be based on the USB PD protocol. Generating a second voltage based on the first voltage can include providing a control signal to a switch included on a primary winding of a step-down transformer included in the first power stage. The control signal can enable the switch to control a number of windings on the primary winding based on a value for the AC voltage. Generating a second voltage based on the first voltage can include providing a control signal to a switch included on a secondary winding of a step-down transformer included in the first power stage. The control signal can enable the switch to control a number of windings on the secondary winding based on a value for the AC voltage. Generating a first voltage based on the AC voltage can include inputting the AC voltage to an electromagnetic interference (EMI) filter, suppressing, by the EMI filter, noise included on the AC voltage, inputting the noise-suppressed AC voltage to an AC rectifier bridge, and outputting, by the AC rectifier bridge, the full-wave rectified voltage as the first voltage.

In yet another general aspect, a power adapter can include a rectifier, a cable including a plug connected to an alternating current (AC) power source, the AC power source providing an AC voltage to the rectifier, a power delivery adapter controller, a multipurpose port, and a two-stage adapter circuit including a first power stage and a second power stage. The first power stage can be configured to receive a first voltage generated by the rectifier and based on the AC voltage, and configured to output a second voltage. The second power stage can be configured to receive the second voltage and configured to convert the second voltage to a third voltage. The power delivery adapter controller can be configured to receive at least one input indicative of a requested voltage value from the multipurpose port and configured to provide at least one output for use by the second power stage. The second power stage can be configured to determine a value for the third voltage based on the at least one output and configured to provide the third voltage to the multipurpose port.

Example implementations may include one or more of the following features. For instance, the multipurpose port can be a USB Type-C port that implements a USB power delivery (PD) protocol.

The details of one or more implementations are set forth in the accompanying drawings and the description below. Other features will be apparent from the description and drawings, and from the claims.

BRIEF DESCRIPTION OF THE DRAWINGS

FIG. 5A is a diagram of a step-down transformer that includes a switch on a primary winding of the step-down transformer.

FIG. 5B is a diagram of a step-down transformer that includes a switch on a secondary winding of the step-down transformer.

Like reference symbols in the various drawings indicate like elements.

DETAILED DESCRIPTION

Figure 1A:
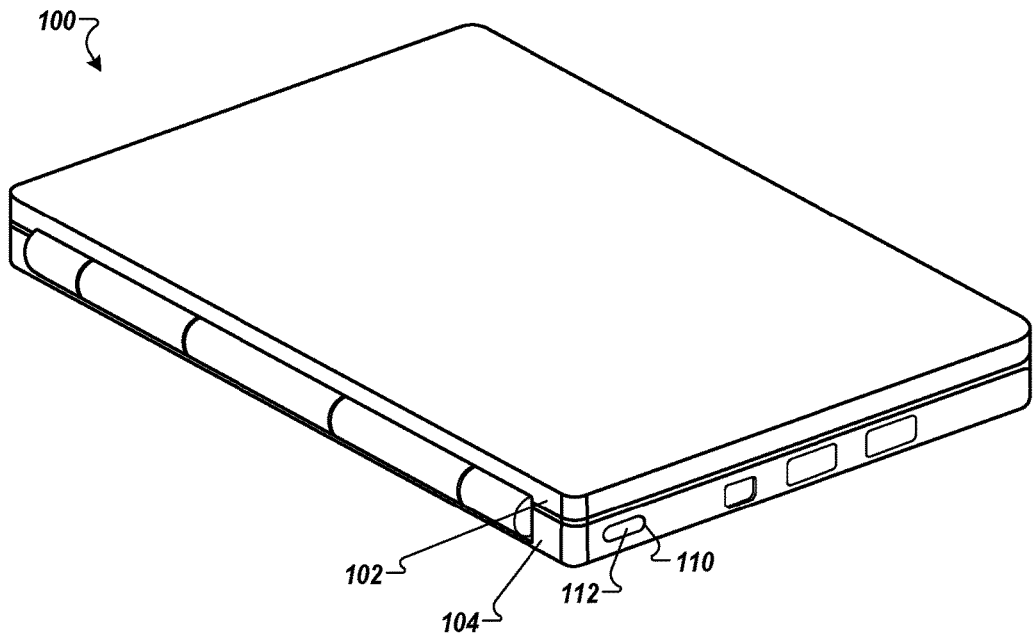
FIG. 1A is a diagram that illustrates a computing device according to an example embodiment.

Computing devices can include, but are not limited to, laptop computers, notebook computers, tablets, netbooks, smartphones, personal digital assistants, desktop computers, mobile phones, and mobile computing devices. A computing device can include multiple connectors or receptacles incorporated into multiple ports or sockets included on the computing device. The connector or receptacle can interface with/connect to cables and/or devices that include a connector or plug that properly mates with/connects to the type of connector or receptacle included in the computing device. In some implementations, a computing device can include multiple different types of connectors. The multiple different types of connectors can include, but are not limited to, Universal Serial Bus (USB) connectors, Ethernet connectors (e.g., RJ 45 connector), microphone/headphone ports, power jacks or connectors, and video connectors (e.g., DisplayPort connectors, DVI-D connectors, HD15 connectors, and High-Definition Multimedia Interface (HDMI) connectors).

In some implementations, a computing device can include one or more multipurpose ports that can be implemented using a single type of connector that can accept and/or deliver power, data and display information. The connector may support one or more communication and/or power delivery standards. For example, the multipurpose port can be a USB Type-C port that is implemented using a USB Type-C connector. A USB Type-C port (connector) can support USB standards such as USB 3.1 and USB power delivery (PD).

The multipurpose port can be a bi-directional port that supports power transfers. A first device incorporating (including) the multipurpose port can transfer power by either sending power to or receiving power from a second device that also incorporates (includes) the multipurpose port. The power transfer between the first device and the second device can occur at the same time the multipurpose port on the first device is transmitting data to and/or receiving data from the second device. In some implementations, the first device can be a computing device and the second device can be a portable battery pack. In some implementations, the first device can be a computing device and the second device can be an external power supply. In some implementations, the first device can be a computing device and the second device can be a display device (a monitor). In some implementations, the first device can be a computing device and the second device can be a computing device.

The amount of power delivered between a first device and a second device can vary based on device types and based on the capabilities of the bi-directional port included in each device. For example, a USB Type-C port (connector) that implements USB PD can be capable of transferring approximately 2.5 Watts to 100 Watts of power. One or more pins included in the multipurpose port can be used to negotiate an amount of power for transfer between the devices. In addition, the voltage provided by the one or more pins can range from approximately five volts to twenty volts, and can be any voltage between and including five volts and twenty volts.

When a first device is negotiating an output voltage with a second device, the first device begins the negotiations at five volts and continues to twenty volts. The devices, therefore, are capable of varying a voltage output from five volts to twenty volts. In order to provide this voltage variation, the device may not include a single stage voltage adapter. The device can include a multi-stage voltage adapter.

In order to meet power safety requirements for the device, a power supply designed for the device can implement power supply isolation. A power supply can process high voltages with low impedances that can be considered dangerous if a user of the device were to make contact with the high voltages. A device can implement power supply isolation to prevent user contact with the dangerous voltages. Transformers used within a power supply to transform the high voltages to lower voltages for use in the device can also function as safety isolation transformers.

When implementing power supply isolation for a device that includes a multipurpose port (e.g., a USB Type-C port), different controllers can be located on and used with each side of the transformer. A first controller can be located on a primary side of a transformer. The first controller can control power stages of the power supply. A second controller can be located on a secondary side of the transformer. The second controller can be a rectifier and port controller. The second controller can control the multipurpose port (e.g., a USB Type-C controller). The second controller can also provide synchronized rectifier control. The primary side control for the transformer (the first controller) and the secondary side control for the transformer (the second controller) are implemented in two different stages. In some cases, the primary side control for the transformer (the first controller) and the secondary side control for the transformer (the second controller) may not be integrated into a single controller for the transformer. In some cases, the primary side control for the transformer (the first controller) and the secondary side control for the transformer (the second controller can be integrated into a single controller for the transformer. The integration may complicate the design of the power supply as well as increase the cost of the power supply, while being easier to integrate into the power supply.

In some implementations, a low voltage power supply can include a single controller to control each side of a transformer (a primary side and a secondary side). The single controller and the transformer can be included in a single stage adapter circuit. The single stage adapter circuit can also include a flyback converter. A voltage during an off phase or state of the flyback converter can be transformed down to a value determined by the ratio of the turns of the transformer. Use of a flyback converter can provide multiple voltage outputs using a minimum number of components. For example, each additional output voltage can include an additional transformer winding, an additional diode, and an additional capacitor. A voltage during an on phase or state of the flyback converter can be the value of an approximated direct current (DC) component of the voltage.

In these implementations, a control loop included in the single stage adapter circuit can introduce time delays in the power supply. The time delays can be a result of the inclusion of a bulk capacitor on both the primary side of the transformer and the secondary side of the transformer.

In some implementations, the single stage adapter circuit can be incorporated into a high voltage power supply that can also include an electromagnetic interference (EMI) filter and an alternating current (AC) rectifier. The output of the AC rectifier can be provided to (input to) the primary side of the transformer. In addition, power factor correction (PFC) can be included after the AC rectifier.

When a single stage adapter circuit is incorporated into a power supply, a bulk capacitor is included on both the primary side of the transformer and the secondary side of the transformer. In a two-stage adapter circuit, the inclusion of a bulk capacitor on both the primary side of the transformer and the secondary side of the transformer can be eliminated. A first stage of the two-stage adapter circuit can step down a rectified AC high voltage to lower AC voltage by using, for example, a step-down transformer. A capacitor included on the input and/or the output of the first stage of the two-stage adapter circuit can determine an amount of AC ripple on the lower AC voltage. The lower AC voltage (including the AC ripple) can be provided as an input voltage to the second stage of the two-stage adapter circuit. The minimum voltage value for the second stage input voltage (the lower AC voltage that includes the AC ripple) can be a voltage that is greater the maximum voltage the power supply can provide as an output voltage. The first stage of the two-stage adapter circuit can provide the necessary power supply isolation because the transformer used to transform the high AC voltage to a lower AC voltage can function as a safety isolation transformer.

The second stage of the two-stage adapter circuit can include a synchronous buck converter. The buck converter can be controlled to provide an output voltage for the power supply as negotiated by a power delivery system. The output voltage can be a voltage value that is less than the voltage value for the second stage input voltage. The second stage output voltage (and subsequently the output voltage of the power supply) can be determined by a duty cycle of the second stage of the two-stage adapter circuit.

FIG. 1A is a diagram that illustrates a computing device 100 according to an example embodiment. The computing device 100 is shown in a closed position and from a first side view (a lid portion 102 is placed above and substantially in contact with a base portion 104). A first side of the base portion 104 of the computing device 100 can include a multipurpose port 110 that can be implemented using a single type of connector 112. The computing device 100 can receive electrical power and/or data from multipurpose port 110. For example, the computing device 100 can include, but is not limited to, a laptop or notebook computer. In some implementations, the multipurpose port 110 can be a USB Type-C port (connector).

Figure 1B:
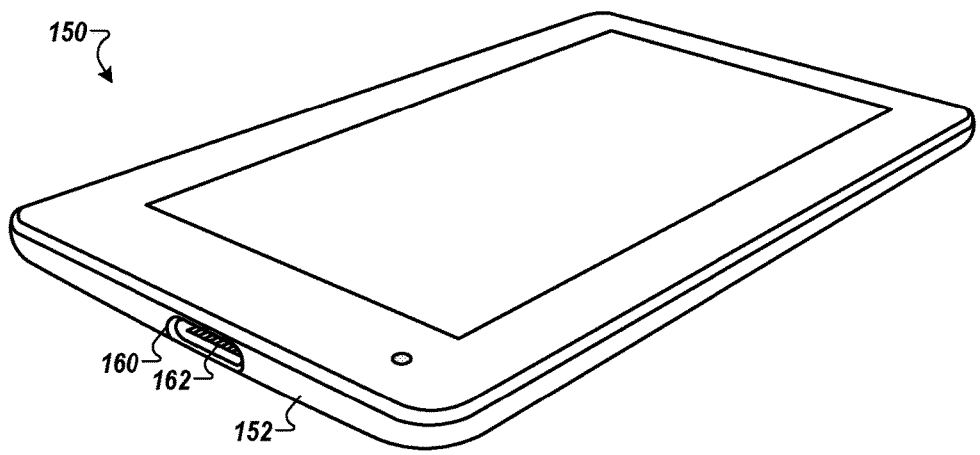
FIG. 1B is a diagram that illustrates a computing device according to another example embodiment.

FIG. 1B is a diagram that illustrates a computing device 150 according to another example embodiment. The computing device 150 can be a portable communication device. The computing device 150 can include, but is not limited to, a tablet computer, a personal digital assistant (PDA), a mobile computing device, or a mobile communication device including a mobile cellular phone, a smartphone, or a wireless phone. A first side 152 of the computing device 150 can include a multipurpose port 160 that can be implemented using a single type of connector 162. The computing device 150 can receive electrical power and/or data from multipurpose port 160. The multipurpose port 160 and the connector 162 can be the same as the multipurpose port 110 and the connector 112, respectively, as shown in FIG. 1A. As in FIG. 1A, in some implementations, the multipurpose port 160 can be a USB Type-C port (connector).

In some implementations, other types of connectors that can support one or more functions can be incorporated into multipurpose ports of a computing device. The functions can include, but are not limited to, transmitting and receiving high speed, secure data, providing or receiving data signals for a display (monitor) connection, supplying or delivering power, and charging of a battery included in the computing device.

A cable with appropriate connectors or plugs included on each end of the cable can connect/interface a peripheral to the computing device. A first end of a cable can include a connector or plug that can interface with, connect, or plug into a connector included in a multipurpose port of the computing device. A second end of the cable can include a connector or plug that can interface with, connect, or plug into a connector included in a multipurpose port of the peripheral device. In some implementations, the connector included in the multipurpose port of the computing device and the connector included in the multipurpose port of the peripheral device are the same type of connector (e.g., a USB Type-C connector).

In some implementations, the peripheral device may include a connector that is not incorporated into a multipurpose port. In these implementations, the peripheral device may be connected to the connector incorporated into the multipurpose port of the computing device using an adapter cable. The adapter cable can provide the appropriate connectors or plugs on either end of the cable that can connect, interface with, or plug into the computing device and the peripheral device. In addition, the adapter cable can ensure the correct electrical wiring of signals from the computing device to the peripheral device by way of the different connectors. In these implementations, an adapter cable can be used in those cases where there is compatibility between signals provided/transported/carried by the contacts or pins included in the type of connector incorporated into the multipurpose port and the type of connector included in the port of the peripheral device.

Figure 2:
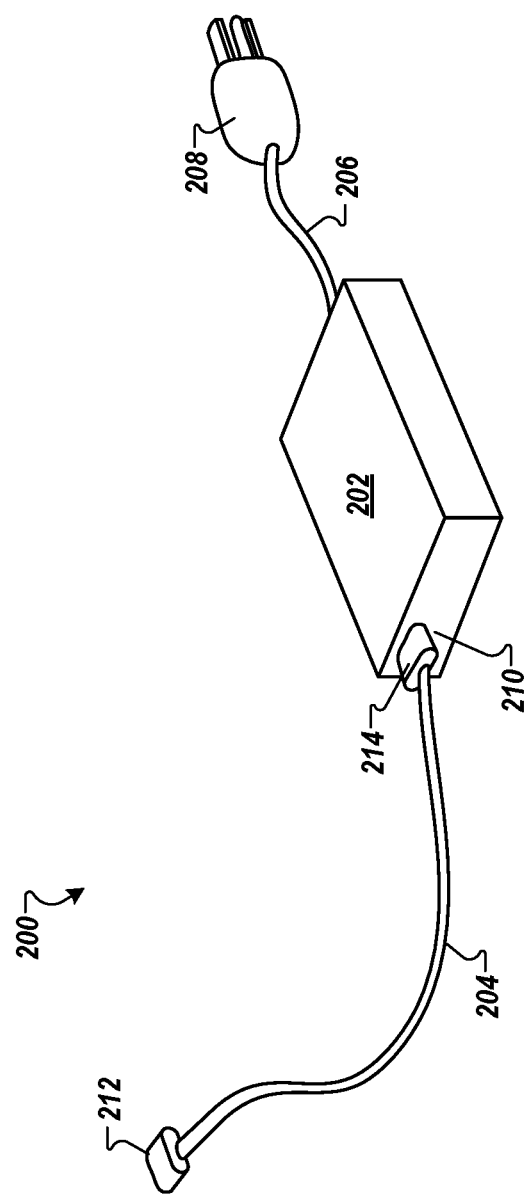
FIG. 2 is a diagram illustrating an example system for implementing an example power adapter that includes a two-stage adapter circuit.

FIG. 2 is a diagram illustrating an example system 200 for implementing an example power adapter 202 (power supply) that includes a two-stage adapter circuit as described with reference to FIG. 3 and FIG. 4.

Referring to FIGS. 1A and 1B, in some implementations, the computing device 100 and the computing device 150 can utilize the power adapter 202 to convert an alternating current (AC) power signal to a direct current (DC) power signal for use by the computing device 100 and the computing device 150. For example, the power adapter 202 can include one or more multipurpose ports (e.g., multipurpose port 210).

The system 200 can include a first cable 204 that can supply power from the power adapter 202 to a computing device. The first cable 204 can include a first multipurpose connector 212 and a second multipurpose connector 214. In the example shown in FIG. 2, the second multipurpose connector 214 can connect to (interface with) the multipurpose port 210 included on the power adapter 202. Referring to FIG. 1A, in some implementations, the first multipurpose connector 212 can connect to (interface with) the multipurpose port 110 included on the computing device 100. Referring to FIG. 1B, in some implementations, the first multipurpose connector 212 can connect to (interface with) the multipurpose port 160 included on the computing device 150.

The power adapter 202 can receive an AC power signal from an AC power source via a second cable 206. The second cable 206 can include a plug 208 for electrically connecting to the AC power source (e.g., a household outlet receptacle). In some implementations, a plug (e.g., the plug 208) can be included (integrated with) the power adapter 202. In these implementations, the second cable 206 is not needed and the power adapter 202 using the plug 208 can electrically connect to the AC power source (e.g., a household outlet receptacle). In some implementations, the power adapter 202 can supply charge power to a power storage component (e.g., a battery) included in a computing device. The power adapter 202 can supply the charge power to the power storage component by way of the first cable 204.

In some implementations, the power adapter 202 can directly connect to (interface with) the computing device 100 and the computing device 150 without the use of the first cable 204. For example, referring to FIG. 1A, the multipurpose port 210 can be configured to connect to (interface with) the multipurpose port 110 included on the computing device 100. For example, referring to FIG. 1B, the multipurpose port 210 can be configured to connect to (interface with) the multipurpose port 160 included on the computing device 150.

Figure 3:
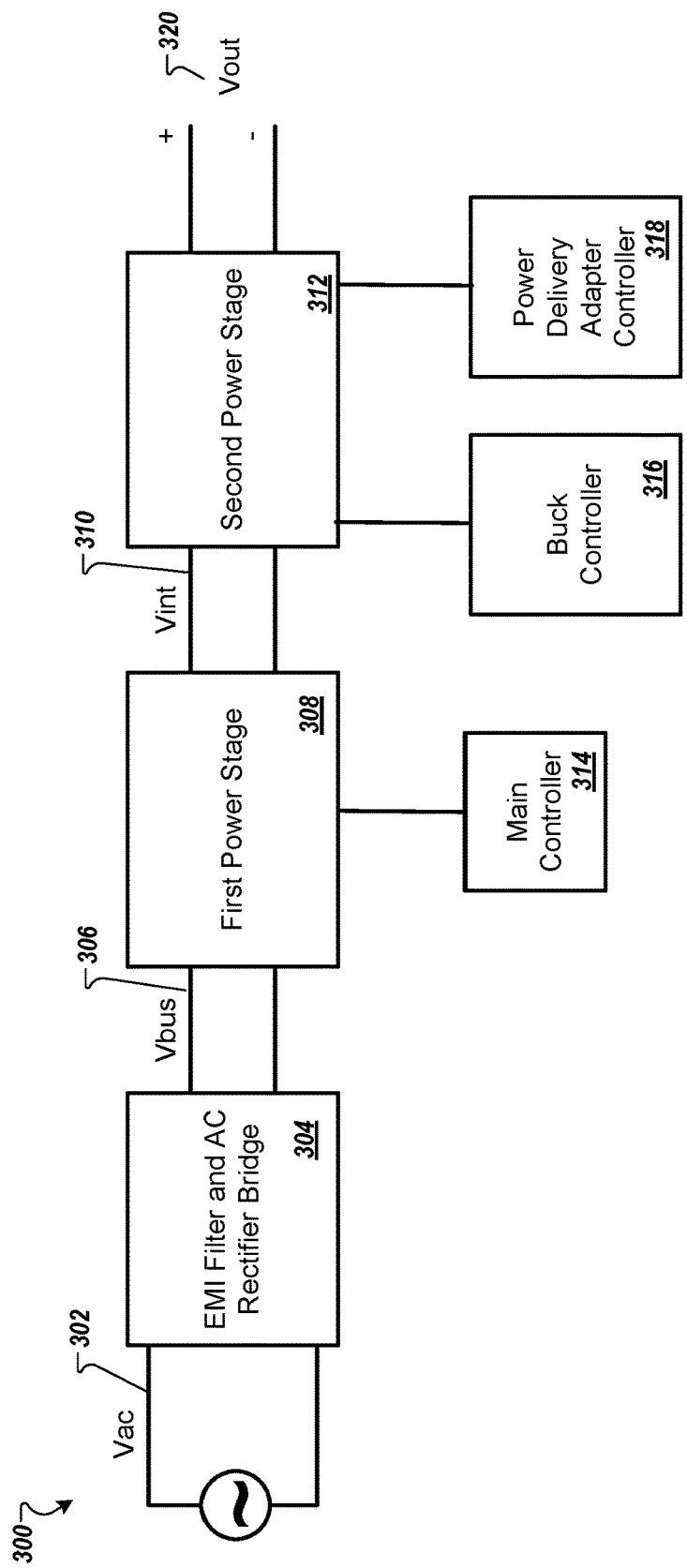
FIG. 3 is a block diagram showing a system that can be included in a power adapter.

FIG. 3 is a block diagram showing a system 300 that can be included in a power adapter. For example, referring to FIG. 2, the system 300 can be included in the power adapter 202. The system 300 incorporates a two-stage adapter circuit in a first power stage 308 and a second power stage 312.

Figure 4:
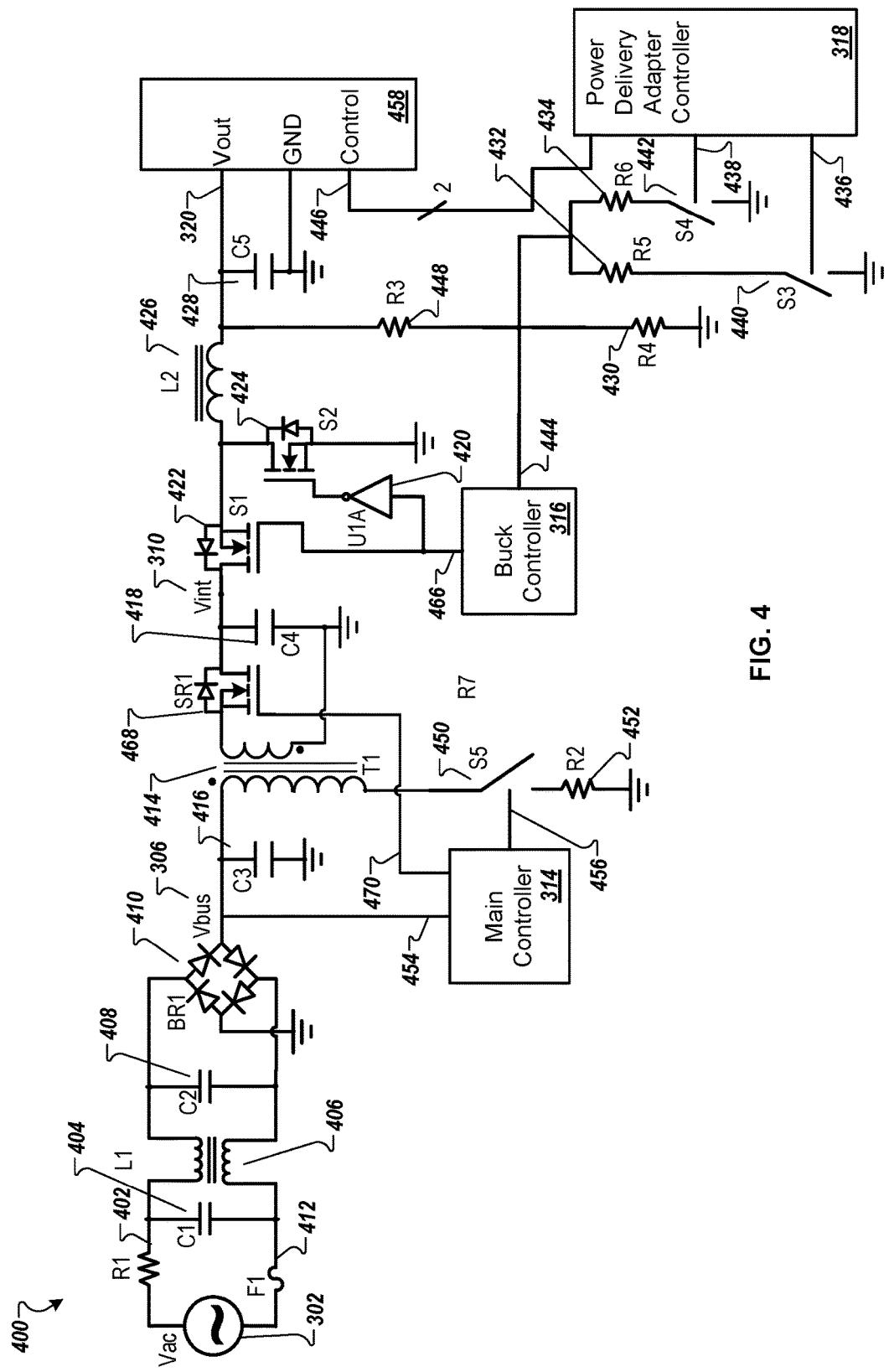
FIG. 4 is a schematic showing example circuitry that can be included in a power adapter that incorporates a two-stage adapter circuit.

FIG. 4 is a schematic showing example circuitry 400 that can be included in a power adapter that incorporates a two-stage adapter circuit. For example, referring to FIGS. 2 and 3, the circuitry 400 can be included in the system 300 that is included in the power adapter 202.

Referring to FIG. 3, the system 300 receives an AC power signal 302 (Vac). The power adapter 202 can receive the AC power signal 302 from an AC power source. As shown in FIG. 2, the plug 208 included in the second cable 206 that is connected to (interfaced with) the power adapter 202 can be connected to the AC power source (e.g., a household outlet receptacle). An electromagnetic interference (EMI) filter and AC rectifier bridge 304 can process the AC power signal 302 for output to the first power stage 308.

Referring to FIG. 4, a resistor (R1) 402, a capacitor (C1) 404, an inductor 406, and a capacitor (C2) 408 comprise the EMI filter included in the EMI filter and AC rectifier bridge 304. Rectifier bridge (BR1) 410 comprises the AC rectifier bridge included in the EMI filter and AC rectifier bridge 304. The EMI filter can suppress any conducted interference or electromagnetic noise that may be present on the input AC power signal 302. The AC rectifier bridge provides full-wave rectification of the input AC power signal 302. The circuitry 400 can include a fuse (F1) 412 that can provide additional protection for the circuitry 400. The fuse (F1) 412 can protect the circuitry 400 from excess current loads that could potentially damage the circuitry 400.

Referring to FIG. 3, the EMI filter and AC rectifier bridge 304 output a full-wave rectified voltage Vbus 306. The voltage Vbus 306 is input to the first power stage 308 of the two-stage adapter circuit. Referring to FIG. 4, a first power stage input capacitor (C3) 416, a first power stage output capacitor (C4) 418, a step-down transformer (T1) 414, a synchronous rectifier (SR1) 468, a switch (S5) 450, and a current sensing resistor (R2) 452 comprise the first power stage 308. The main controller 314 provides a switch control signal 456 to control the switching of the switch (S5) 450. The first power stage 308 can step down the full-wave rectified voltage Vbus 306 to a lower rectified voltage Vint 310 using the step-down transformer (T1) 414 and the duty cycle control provided by the switch (R2) 450. The main controller 314 can generate a synchronous rectifier (SR) control signal 470 for controlling a duty cycle of the step-down transformer 414 based on a closed loop control. The closed loop control can be provided with the output voltage feedback and current signal from the current sensing (R2) 452 when the switch (S5) 450 is closed. The main controller 314 can generate a synchronous rectifier (SR) control signal 470 for controlling a duty cycle of the step-down transformer 414 based on an open loop control when the switch (S5) 450 is opened.

The synchronous rectifier (SR1) 468 can provide a rectified voltage to the capacitor (C4). In the implementation shown in FIG. 4, the synchronous rectifier (SR1) 468 can be implemented as a MOSFET. The control for the synchronous rectifier (SR1) 468 can be provided by a synchronous rectifier (SR) control signal 470. The control for the synchronous rectifier (SR1) 468 can be included in (provided by) the main controller 314. In some implementations, the synchronous rectifier (SR) control signal 470 can be provided by a separate synchronous rectifier (SR) controller.

The first power stage input capacitor (C3) 416 included on the input of the first power stage 308 and the first power stage output capacitor (C4) 418 included on the output of the first power stage 308 can determine an amount of AC ripple on the lower rectified voltage Vint 310. The lower rectified voltage Vint 310 can be output by the first power stage 308 and provided as an input voltage to the second power stage 312 of the two-stage adapter circuit. A minimum average voltage value for the lower rectified voltage Vint 310 can be a DC voltage value that is greater than or equal to a maximum DC voltage that the system 300 can provide as an output voltage (e.g., output voltage Vout 320).

For example, a peak value for the full-wave rectified voltage Vbus 306 can be equal to 110x√2=156 VDC and the first power stage 308 using the step-down transformer (T1) 414 can output the lower rectified voltage Vint 310 such that the system 300 can provide a voltage output of up to 25 Volts. For example, a peak value for the full-wave rectified voltage Vbus 306 can be equal to 220x√2=311 VDC and the first power stage 308 using the step-down transformer (T1) 414 can output the lower rectified voltage Vint 310 such that the system 300 can provide a voltage output of up to 50 volts. The turns ratio of the step-down transformer (T1) 414 and the duty cycle control provided by the switch (S5) 450 control the value of the lower rectified voltage Vint 310.

The first power stage 308 of the two-stage adapter circuit can provide the necessary power supply isolation because the step-down transformer (T1) 414 can function as a safety isolation transformer. This over-voltage protection can protect against abnormal conditions for the system 300 (and the circuitry 400). The main controller 314 receives the full-wave rectified voltage Vbus 306 at a voltage input 454. The main controller 314 provides duty cycle control for the step-down transformer (T1) 414 by controlling the switching of the switch (S5) 450.

In some implementations, fixed duty cycle control can be implemented. Using fixed duty cycle control, a value of the lower rectified voltage Vint 310 can vary widely based on the wide range of values (e.g., from 90 VAC to 264 VAC) for the AC power signal 302. In some implementations, two level fixed duty cycle control can be implemented based on a value for the AC power signal 302. A first group of AC voltages can include low AC voltages (e.g., 115 VAC) and a second group of AC voltages can include high AC voltages (e.g., 220 VAC). For example, the duty cycle can be doubled when a value for the AC power signal 302 is in the low AC voltage group. This can reduce by one-half a value for a range of the lower rectified voltage Vint 310. In some implementations, as will be described in more detail with reference to FIGS. 5A-B, fixed-duty cycle control can be used and the turns ratio of the step-down transformer (T1) 414 can be further controlled using a switch on either a primary winding of the step-down transformer (T1) 414 or on a secondary winding of the step-down transformer (T1) 414.

The second power stage 312 of the two-stage adapter circuit can include a synchronous buck converter controlled by a buck controller 316. Referring to FIG. 4, inverter (U1A) 420, switch (S1) 422, switch (S2) 424, inductor (L2) 426, and capacitor (C5) 428 comprise the synchronous buck converter. In some implementations, for example as shown in FIG. 4, switch (S1) 422 and switch (S2) 424 can be implemented as a metal oxide semiconductor field effect transistors (MOSFETs). In these implementations, the MOSFETs can be used as electronically controlled switches. In some implementations, one or more of switch (S5) 450, the switch (S3) 440, and the switch (S4) 442 can also be implemented as a MOSFET. In some implementations, one or more of switch (S5) 450, the switch (S3) 440, and the switch (S4) 442 can be implemented as bipolar junction transistors (BJTs). In some implementations, the switch (S1) 422 and the switch (S2) 424 can be included in (integrated with) the buck controller 316.

In addition, resistor (R3) 448, resistor (R4) 430, resistor (R5) 432, and resistor (R6) 434 provide a feedback control input 444 to the buck controller 316. The buck controller 316 can control the opening and closing of switch (S1) 422 and switch (S2) 424 based on input received from the power delivery adapter controller 318 as it controls the opening and closing of switch (S3) 440 and switch (S4) 442. The power delivery adapter controller 318 can provide output 436 and output 438 based on control signals 446 received from a multipurpose port 458. The output 436 controls the switching of the switch (S3) 440, switching the resistor (R5) 432 into and out of the feedback control circuit that provides the feedback control input 444 to the buck controller 316. The output 438 controls the switching of the switch (S4) 442, switching the resistor (R6) 434 into and out of the feedback control circuit that provides the feedback control input 444 to the buck controller 316. For example, referring to FIG. 2, the multipurpose port 458 can be the multipurpose port 210 included in the power adapter 202.

In some implementations, as shown in FIG. 4, the switch (S3) 440, the switch (S4) 442, the resistor (R5) 432, and the resistor (R6) 434 can be placed (located) external to the power delivery adapter controller 318. In some implementations, the switch (S3) 440, the switch (S4) 442, the resistor (R5) 432, and the resistor (R6) 434 can be included in (integrated in) the power delivery adapter controller 318. In the implementation shown in FIG. 4, the use of two switches switching two resistors into and out of the feedback control circuit that provides the feedback control input 444 to the buck controller 316 provides four different feedback input control signals (voltages) as the feedback control input 444 to the buck controller 316 resulting in the circuitry 400 providing four different values for the output voltage Vout 320.

In some implementations, more than two switches switching more than two resistors into and out of the feedback control circuit that provides the feedback control input 444 to the buck controller 316 can provide more than four different feedback input control signals (voltages) as the feedback control input 444 to the buck controller 316 resulting in the circuitry 400 providing more than four different values for the output voltage Vout 320. In some implementations, less than two switches (e.g., a single switch) switching more less that two resistors (e.g., a single resistor) into and out of the feedback control circuit that provides the feedback control input 444 to the buck controller 316 can provide less than four different feedback input control signals (voltages) (e.g., two different feedback input control signals (voltages)) as the feedback control input 444 to the buck controller 316 resulting in the circuitry 400 providing less than four different values (e.g., two different values) for the output voltage Vout 320.

In some implementations, a computing device by way of the multipurpose port 458 can request a value for the output voltage Vout 320 that may be greater than a maximum value for the output voltage Vout 320 that the circuitry 400 (and the system 300) can provide. The circuitry 400 (and the system 300) can negotiate a value for the output voltage Vout 320 with the computing device. Once determined, the power delivery adapter controller 318 can provide the appropriate signals on the output 438 and the output 436 to provide the feedback control input 444 to the buck controller 316. In these implementations, the circuitry 400 (and the system 300) can provide the maximum value for the output voltage Vout 320.

In some implementations, a computing device by way of the multipurpose port 458 can request a value for the output voltage Vout 320 that may be less than a minimum value for the output voltage Vout 320 that the circuitry 400 (and the system 300) can provide. The circuitry 400 (and the system 300) can negotiate a value for the output voltage Vout 320 with the computing device. Once determined, the power delivery adapter controller 318 can provide the appropriate signals on the output 438 and the output 436 to provide the feedback control input 444 to the buck controller 316. In these implementations, the circuitry 400 (and the system 300) can provide the minimum value for the output voltage Vout 320.

In the example shown in FIG. 4, the control signals 440 can be two control signals. The two control signals can be binary value signals that, used together, can represent four different binary values (e.g., 00, 01, 10, 11). Each binary value can be associated with a desired output voltage Vout 320. Controlling the switching of resistor (R5) 432 and resistor (R6) 434 varies the feedback control input 444 to the buck controller 316. The buck controller 316 controls the duty cycle of an output control signal 466 based on the feedback control input 444. The duty cycle of the output control signal 466 controls the switching of the switch (S1) 422 and the switch (S2) 424 included in the synchronous buck converter. The duty cycle of the switching of the switch (S1) 422 and the switch (S2) 424 determines the output voltage Vout 320 for the system 300.

The buck controller 316 uses the feedback control input 444 and an internal reference voltage to determine a voltage value for the output voltage Vout 320. The internal reference voltage can be compared to a feedback voltage (e.g., the feedback control input 444) using an error amplifier when determining the duty cycle of the output control signal 466. The duty cycle of the switching of the switch (S1) 422 and the switch (S2) 424 determines the output voltage Vout 320 for the circuitry 400 (the system 300).

The buck controller 316 adjusts (controls) the duty cycle of the switching of the switch (S1) 422 and the switch (S2) 424 included in the synchronous buck converter in order to provide (output) the desired output voltage Vout 320. The desired output voltage Vout 320 is associated with the feedback control input 444 as input to the buck controller 316. The feedback control input 444 is determined based on the state (e.g., closed or open) of the switch (S3) 440 and the state (e.g., closed or open) of the switch (S4) 442. The state of the switch (S3) 440 is determined by the output 436 from the power delivery adapter controller 318. The state of the switch (S4) 442 is determined by the output 438 from the power delivery adapter controller 318. The output 436 and the output 438 from the power delivery adapter controller 318 are determined based on the control signals 446. In some implementations, the control signals 446 can be capable of bidirectional communication allowing for negotiations between the power delivery adapter controller 318 and a computing device when the system 300 and the computing device are connected by way of the multipurpose port 458.

The buck converter can provide one of a plurality of voltage values as the output voltage Vout 320 for the system 300. Referring to FIGS. 2 and 3, the voltage value for outputting as the output voltage Vout 320 is negotiated by the system 300 with a computing device using the power delivery adapter controller 318. The negotiations and the voltage value can be based on a protocol associated with the connection of the power adapter 202 to the computing device. The output voltage Vout 320 can be a DC voltage value that is less than the average for the lower rectified voltage Vint 310.

In some implementations, as shown in FIG. 3 and FIG. 4, the main controller 314, the buck controller 316, and the power delivery adapter controller 318 can be separate controllers or devices. In some implementations, the main controller 314, the buck controller 316, and the power delivery adapter controller 318 can be implemented as (incorporated in) a single controller or device. In some implementations, the buck controller 316 and the power delivery adapter controller 318 can be implemented as (incorporated in) a single controller or device. In some implementations, the buck controller 316 and the main controller 314 can be implemented as (incorporated in) a single controller or device. In some implementations, the main controller 314 and the power delivery adapter controller 318 can be implemented as (incorporated in) a single controller or device.

In some implementations, referring to FIG. 2, FIG. 3, and FIG. 4, the system 300 can be used in a power adapter (e.g., the power adapter 202) that can output multiple voltage values dependent on the negotiated requirement of a computing device connected to the power adapter. In some implementations, the system 300 can be used in a power adapter (e.g., the power adapter 202) that can output a single voltage value. In these implementations, the power delivery adapter controller 318 may not be needed because the second power stage will output a single voltage as the output voltage Vout 320.

Referring to FIGS. 1A-B, 2, 3, and 4, the multipurpose port 110, a multipurpose port 160, and he multipurpose port 210 can be USB Type-C ports that are capable of USB power delivery (PD). A USB Type-C port (connector) that implements the USB PD protocol can be capable of transferring (providing and receiving) approximately 2.5 Watts to 100 Watts of power. One or more cable bus pins (e.g., Vbus pins) included in the USB Type-C port (connector) can provide a form of an electronic identification (ID) that the USB PD protocol can read and interpret to determine the capability or requirements for power delivery to (or from) a computing device. In addition, CC1 and CC2 are used for plug configuration detection. Either CC1 or CC2 can become $V_{CONN}$ for cable or adapter power and the other can be used for USB PD communication between devices.

As shown in FIG. 4, for example, the control signals 446 can be the USB Type-C cable bus pins (e.g., Vbus pins) that can be used to negotiate the required power from the device as supplied by the system 300. For example, based on the USB Type-C PD protocol, the system 300 can be configurable to provide five power profiles. The values of the resistor (R3) 448, the resistor (R4) 430, the resistor (R5) 432, and the resistor (R6) 434 are select accordingly to provide the output voltage Vout 320 for each of the five power profiles.

In a non-limiting example, a first (and default) power profile is for the output voltage Vout 320 to equal five volts at two Amperes (Amps) of current, sourcing up to ten Watts of power. In a non-limiting example, a second power profile is for the output voltage Vout 320 to equal five volts at two Amps of current and for the output voltage Vout 320 to equal 12 volts at 1.5 Amps of current, sourcing up to 18 Watts of power. For example, referring to FIG. 4, the second power profile can be when switch (S3) 440 is open and switch (S4) 442 is open. The buck controller 316 can determine the value for output voltage Vout 320 using Equation 1.

$$Vout = \frac{Vref}{R4} \times (R3 + R4) \qquad \text{Equation 1}$$

In a non-limiting example, a third power profile is for the output voltage Vout 320 to equal five volts at two Amps of current and for the output voltage Vout 320 to equal 12 volts at three Amps of current, sourcing up to 36 Watts of power. For example, referring to FIG. 4, the third power profile can be when switch (S3) 440 is closed and switch (S4) 442 is open. The buck controller 316 can determine the value for output voltage Vout 320 using Equation 2.

$$Vout = \frac{Vref}{R4 \times R5 / R4 + R5} \times ((R4 \times R5 / R4 + R5) + R3) \qquad \text{Equation 2}$$

In a non-limiting example, a fourth power profile is for the output voltage Vout 320 to equal five volts at two Amps of current, to equal 12 volts at three Amps of current, and to equal 20 volts at three Amps of current, sourcing up to 60 Watts of power. For example, referring to FIG. 4, the fourth power profile can be when switch (S3) 440 is open and switch (S4) 442 is closed. The buck controller 316 can determine the value for output voltage Vout 320 using Equation 3.

$$Vout = \frac{Vref}{R4 \times R6 / R4 + R6} \times ((R4 \times R6 / R4 + R6) + R3) \qquad \text{Equation 3}$$

In a non-limiting example, a fifth power profile is for the output voltage Vout 320 to equal five volts at two Amps of current, to equal 12 volts at five Amps of current, and to equal 20 volts at five Amps of current, sourcing up to 100 Watts of power. For example, referring to FIG. 4, the fifth power profile can be when switch (S3) 440 is closed and switch (S4) 442 is closed. The buck controller 316 can determine the value for output voltage Vout 320 using Equations 4, 5, and 6.

$$Ra = \frac{R5 \times R6}{R5 + R6} \qquad \text{Equation 4}$$

$$Rb = \frac{Ra \times R4}{Ra + R4} \qquad \text{Equation 5}$$

$$Vout = \frac{Vref}{Rb} \times (Rb + R3) \qquad \text{Equation 6}$$

FIG. 5A is a diagram of a step-down transformer 500 that includes a switch (S6) 502 on a primary winding 504 of the step-down transformer 500. For example, the step-down transformer 500 can be the step-down transformer 414 as shown in FIG. 4. The step-down transformer 500 includes the primary winding 504 and a secondary winding 506.

Universal worldwide AC voltage can vary from 90 Alternating Current Volts (VAC) to 264 VAC (e.g., from 100 VAC to 240 VAC with a ten percent margin). In general, however, AC voltages can be divided into two groups: a first group that can include low AC voltages (e.g., 115 VAC as in the United States) and a second group that can include high AC voltages (e.g., 220 VAC as in China).

Referring to FIG. 3 and FIG. 4, the first power stage 308 can provide unregulated or semi-regulated control for providing the lower rectified voltage Vint 310. In some implementations, when providing unregulated control, the first power stage 308 can step down the full-wave rectified voltage Vbus 306 to the lower rectified voltage Vint 310 using a step-down transformer (e.g., the step-down transformer 414) that includes a fixed transformer turns-ratio with a fixed duty cycle. This can result in a wide range for the voltage output by the step-down transformer (e.g., a wide range of voltages for the lower rectified voltage Vint 310) that is dependent on the AC voltage value for the full-wave rectified voltage Vbus 306. As described, since the universal worldwide AC voltage can vary from 90 VAC to 264 VAC, the lower rectified voltage Vint 310 can also vary, proportionally, in the same wide range. Inputting the wide range of values for the lower rectified voltage Vint 310 into the second power stage 312 can make the implementation of the second power stage 312 challenging and difficult.

Referring to FIG. 3, FIG. 4, and FIG. 5A, in some implementations that incorporate the use of semi-regulated control for providing the lower rectified voltage Vint 310, a VAC control signal 510 can control the switch (S6) 502 to control the number of turns or windings on the primary winding 504 of the step-down transformer 500. For example, the main controller 314 can determine if a value for the full-wave rectified voltage Vbus 306 falls within the first group of low AC voltages or the second group of high AC voltages. The main controller 314 can provide as an output signal the VAC control signal 510.

In a first case, the VAC control signal 510 can be equal to a first value that will close the switch (S6) 502 when the full-wave rectified voltage Vbus 306 falls within the first group of high AC voltages. In this first case, the turns ratio for the step-down transformer 500 can be n:1 and a duty cycle for the step-down transformer 500 can be equal to D. In a second case, the VAC control signal 510 can be equal to a second value that will open the switch (S6) 502 when the full-wave rectified voltage Vbus 306 falls within the second group of high AC voltages. Closing the switch (S6) 502 doubles the duty cycle of the step-down transformer 500 (e.g., the duty cycle for the step-down transformer 500 can be equal to 2D) as compared to when the switch (S6) 502 is open. Closing the switch (S6) 502 is equivalent to the doubling of the duty cycle by the switching resistor (R2) 450. Closing the switch (S6) 502 reduces the turns ratio of the step-down transformer 500 by fifty percent as compared to when the switch (S6) 502 is open (e.g., the turns ratio for the step-down transformer 500 can be equal to (n/2:1).

When the first power stage 308 implements semi-regulated control for providing the lower rectified voltage Vint 310 by controlling of state of the switch (S6) 502 to control the turns ratio (the duty cycle) of the step-down transformer 500, the range of values for the output voltage for the step-down transformer 500 can be reduced by fifty percent as compared to when the first power stage implements unregulated control (e.g., the range of values for the lower rectified voltage Vint 310 can be reduced by fifty percent).

FIG. 5B is a diagram of a step-down transformer 550 that includes a switch (S7) 552 on a secondary winding 556 of the step-down transformer 550. For example, the step-down transformer 500 can be the step-down transformer 414 as shown in FIG. 4. The step-down transformer 550 includes a primary winding 554 and the secondary winding 556.

Referring to FIG. 3, FIG. 4, FIG. 5A, and FIG. 5B, in some implementations that incorporate the use of semi-regulated control for providing the lower rectified voltage Vint 310, the VAC control signal 510 can control the switch (S7) 552 to control the number of turns or windings on the secondary winding 556 of the step-down transformer 550. In some implementations, the main controller 314 can determine if a value for the full-wave rectified voltage Vbus 306 falls within the first group of low AC voltages or the second group of high AC voltages. The main controller 314 can provide as an output signal the VAC control signal 510. In these implementations, signal isolation may be needed in order for the main controller 314 to control and interface with signals on the primary winding 554 and the secondary winding 556. In some implementations, the main controller 314 can control and interface with signals on the primary winding 554 (the primary winding side) of the step-down transformer 550 and a separate controller can control and interface with signals on the secondary winding 556 (the secondary winding side) of the step-down transformer 550. In these implementations, referring to FIG. 4 (for example, the step-down transformer 550 can be the step-down transformer 414), the controller on the secondary winding side (the secondary winding 556) of the step-down transformer 550 can detect (determine) a value for the lower rectified voltage Vint 310. Controlling the opening and closing of the switch (S7) 552 can be based on the detected (determined) value for the lower rectified voltage Vint 310.

In a first case, the VAC control signal 510 can be equal to a first value that will open the switch (S7) 552 when the full-wave rectified voltage Vbus 306 falls within the first group of high AC voltages. In this first case, the turns ratio for the step-down transformer 550 can be n:1 and a duty cycle for the step-down transformer 500 can be equal to D. In a second case, the VAC control signal 510 can be equal to a second value that will close the switch (S7) 552 when the full-wave rectified voltage Vbus 306 falls within the second group of high AC voltages. Closing the switch (S7) 552 is equivalent to the doubling of the duty cycle by the switching resistor (R2) 450. Closing the switch (S7) 552 doubles the duty cycle of the step-down transformer 500 (e.g., the duty cycle for the step-down transformer 550 can be equal to 2D) as compared to when the switch (S7) 552 is open. Closing the switch (S7) 552 doubles the turns ratio of the step-down transformer 500 as compared to when the switch (S7) 552 is open (e.g., the turns ratio for the step-down transformer 550 can be equal to n:(½)=2n:1).

When the first power stage 308 implements semi-regulated control for providing the lower rectified voltage Vint 310 by controlling of state of the switch (S7) 552 to control the turns ratio (the duty cycle) of the step-down transformer 550, the range of values for the output voltage for the step-down transformer 550 can be reduced by fifty percent as compared to when the first power stage implements unregulated control (e.g., the range of values for the lower rectified voltage Vint 310 can be reduced by fifty percent).

Referring to FIG. 5A and FIG. 5B, each of the switch (S6) 502 and the switch (S7) 552 can be implemented using a MOSFET. The MOSFET for the switch (S7) 552 in FIG. 5B can be a lower voltage MOSFET that the MOSFET for the switch (S6) 502 in FIG. 5A. The use of a lower voltage MOSFET can result in a lower cost for the step-down transformer 550 and compared to the cost of the step-down transformer 500. In addition, the gate driver for the lower voltage MOSFET for the switch (S7) 552 in FIG. 5B can be connected to ground.

In general, the step-down transformer 500 that includes the switch (S6) 502 on the primary winding 504 of the step-down transformer 500, as shown in FIG. 5A, and the step-down transformer 550 that includes the switch (S7) 552 on the secondary winding 556 of the step-down transformer 5505B, as shown on FIG. 5B, show a circuit for reducing a voltage range for the lower rectified voltage Vint 310 by changing (controlling) the turns ratio for a transformer (e.g., the step-down transformer 500 and the step-down transformer 550). In some implementations, a system (e.g., the system 300 that includes the circuitry 400) can use (implement) two level fixed duty cycle control for a transformer (e.g., the step-down transformer (T1) 414) for each of the values of the AC power signal 302 that fall within the first group of low AC voltages or the second group of high AC voltages. For example, the duty cycle of the transformer (e.g., the step-down transformer (T1) 414) can be doubled when a value of the AC power signal 302 is in low voltage group. Thsi can effectively reduce the range for the lower rectified voltage Vint 310 by half. In some implementations, a system (e.g., the system 300 that includes the circuitry 400) can use (implement) fixed duty cycle control for a transformer (e.g., the step-down transformer (T1) 414) for each of the values of the AC power signal 302 but the transformer turns ratio can be changed (as described with reference to FIGS. 5A-B) based on if a value of the AC power signal 302 is the first group of low AC voltages or the second group of high AC voltages.

In some implementations, as shown in FIG. 4, FIG. 5A, and FIG. 5B, the switch (S1) 422, the switch (S2) 424, the switch (S6) 502 and the switch (S7) 552 can be n-channel MOSFET transistors. In some implementations, one or more of the switch (S1) 422, the switch (S2) 424, the switch (S6) 502 and the switch (S7) 552 can be p-channel transistors. In some implementations, one or more of the switch (S3) 440, the switch (S4) 442, and the switch (S5) 450 can be MOSFET transistors, the MOSFET transistor being either a p-channel MOSFET transistor or an n-channel MOSFET transistor.

Referring to the circuitry 400 as shown in FIG. 4, the step-down transformer 500 as shown in FIG. 5A, and the step-down transformer 550 as shown in FIG. 5B, the devices and components included in the circuitry 400, the step-down transformer 500, and step-down transformer 550 can be directly connected as shown as in FIG. 4, FIG. 5A, and FIG. 5B without any additional passive or active intervening devices or components.

Figure 6:
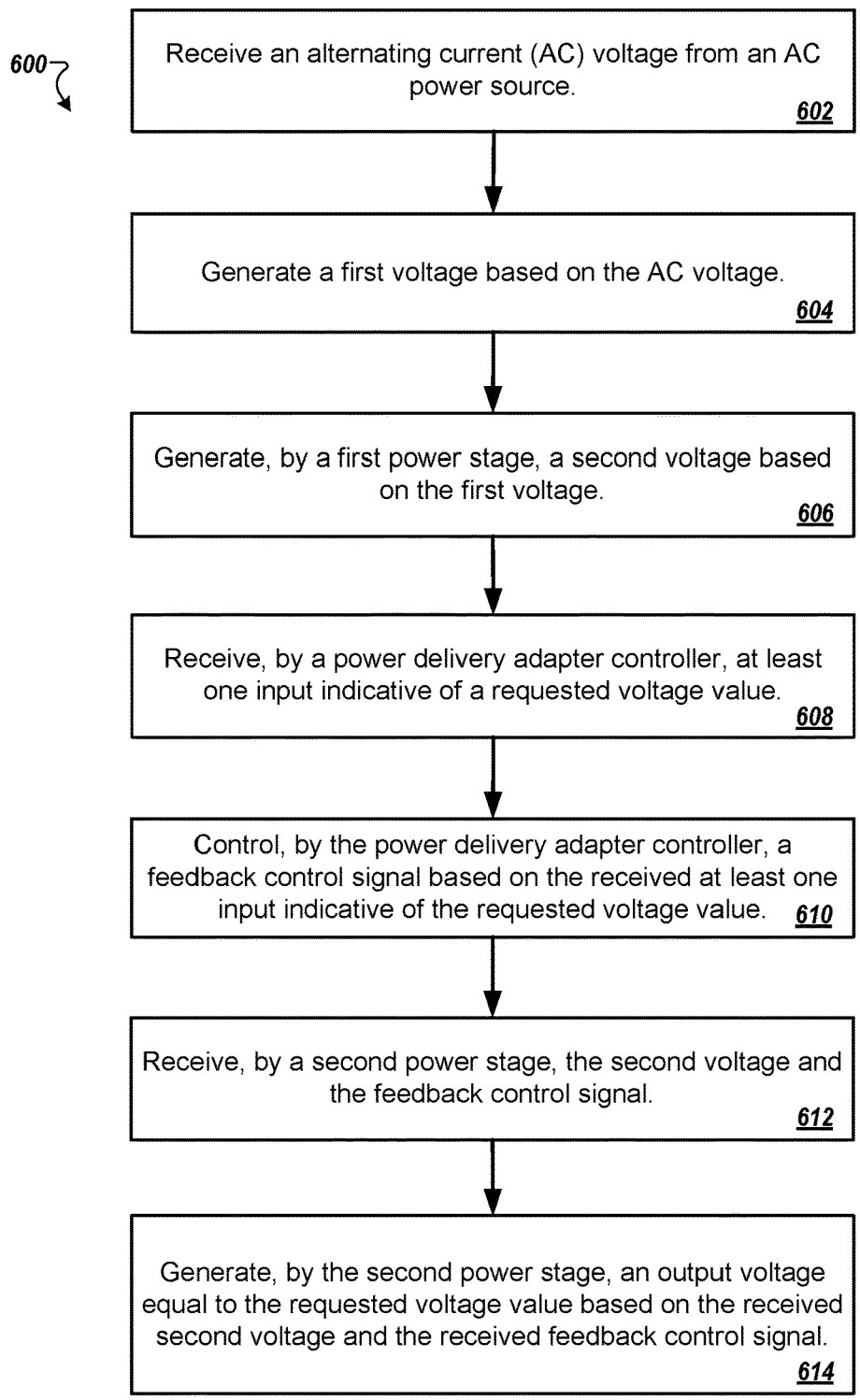
FIG. 6 is a flowchart that illustrates a method for providing power to a computing device.

FIG. 6 is a flowchart that illustrates a method 600 for providing power to a computing device. In some implementations, the systems, methods, and processes described herein can implement the method 600. For example, the method 600 can be described referring to FIGS. 1A-B, 2, 3, 4, and 5A-B.

An alternating current (AC) voltage is received from an AC power source (block 602). For example, referring to FIG. 2, the power adapter 202 can include the second cable 206. The plug 208 included on the second cable 206 can electrically connect to an AC power source, providing the AC voltage as the AC power signal 302 (Vac) as shown in FIG. 3 and FIG. 4. A first voltage based on the AC voltage is generated (block 604). The first voltage can be a full-wave rectified voltage. For example, referring to FIG. 3, the EMI Filter and AC Rectifier Bridge 304 generates the first voltage as the full-wave rectified voltage Vbus 306. A first power stage generates a second voltage based on the first voltage (block 606). The second voltage can be a lower rectified voltage that is less than the first voltage. For example, referring to FIG. 3, the first power stage 308 generates the lower rectified voltage Vint 310.

A power delivery adapter controller receives at least one input indicative of a requested voltage value (block 608). For example, referring to FIG. 3 and FIG. 4, control signals 446 are provided by the multipurpose port 458 to the power delivery adapter controller 318. The control signals 446 can be associated with and used by the power delivery adapter controller 318 to determine a voltage value for outputting as the output voltage Vout 320. The power delivery adapter controller can control a feedback control signal based on the received at least one input indicative of the requested voltage value (block 610). For example, the power delivery adapter controller 318 can provide output 436 and output 438 based on control signals 446. The output 436 controls the switching of the switch (S3) 440, switching the resistor (R5) 432 into and out of the feedback control circuit that provides the feedback control input 444 to the buck controller 316. The output 438 controls the switching of a switch (S4) 442, switching the resistor (R6) 434 into and out of the feedback control circuit that provides the feedback control input 444 to the buck controller 316.

A second power stage can receive the second voltage and the feedback control signal (block 612). For example, referring to FIG. 3 and FIG. 4, the second power stage 312 receives the lower rectified voltage Vint 310 and the feedback control input 444. The second power stage can generate an output voltage equal to the requested voltage value based on the received second voltage and the received feedback control signal (block 614). For example, referring to FIG. 3 and FIG. 4, the second power stage 312 generates the output voltage Vout 320.

One or more advantages can be achieved by the systems, circuits, and methods described herein. For example, referring to FIG. 4, a value for the capacitor (C3) 416 (e.g., a bulk capacitor) can be reduced, allowing a small size capacitor to be included in the circuitry 400. A value for the capacitor (C4) 418 can be increased in order to reduce any AC ripple that may be present on the lower rectified voltage Vint 310. Based on the lower voltage value of the lower rectified voltage Vint 310, a size of the capacitor (C4) can reduced and can be smaller than a size for the capacitor (C3) 416.

Because the synchronous buck converter as controlled by a buck controller 316 can have a fast response time and a fast switching frequency, a dynamic performance for a power adapter that includes the circuitry 400 (e.g., the power adapter 202 as shown in FIG. 2) can be improved. In addition, based on the fast switching frequency, a value for the capacitor (C4) and a value for the capacitor (C5) can each be reduced and/or minimized.

Based on the use of a two-stage adapter circuit as described herein, the first stage of the adapter circuit, and specifically the main controller 314 which provides control signals for a primary winding of the step-down transformer 414, can be a simple and easily implemented design and circuit. In addition, because the buck controller 316 and the power delivery adapter controller 318 can be included on the secondary winding side of the step-down transformer 414, the buck controller 316 and power delivery adapter controller 318 can shared the same ground as the computing device(s) that are connected to the power adapter 202, eliminating the need for any ground isolation requirements (e.g., eliminating the need for the use of an optocoupler) between the ground for the computing device and the ground for the buck controller 316 and the power delivery adapter controller 318.

Figure 7:
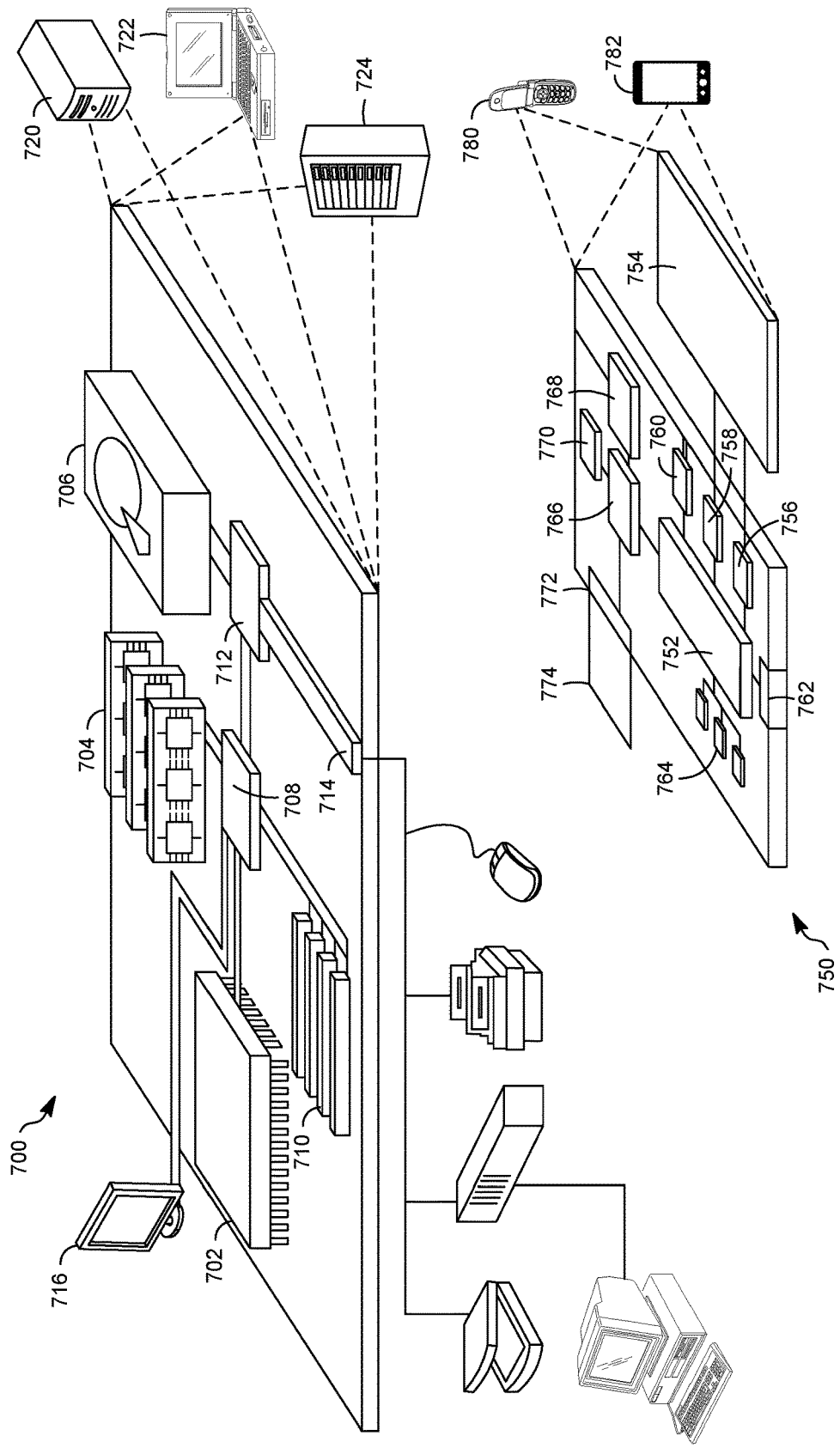
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   an electromagnetic interference (EMI) filter;
   an alternating current (AC) rectifier bridge operatively coupled to the electromagnetic interference filter, the AC rectifier bridge providing a first voltage;
   a first power stage including a step-down transformer, the first power stage configured to receive the first voltage and output a second voltage;
   a second power stage comprising a buck converter and a buck controller operatively coupled to the buck converter and wherein the buck converter is configured to receive the second voltage and configured to convert the second voltage to a third voltage;
   a power delivery adapter controller configured to receive at least one input indicative of a requested voltage value and configured to provide at least one output; and
   a feedback control circuit configured to provide a feedback control input to the buck controller, the feedback control input being based on the at least one output provided by the a power delivery adapter controller, the buck controller configured to control a duty cycle of an output control signal based on the feedback control input, wherein the at least one output provided by the power delivery adapter controller controls a switch that switches a resistor in and out of the feedback control circuit, and wherein the buck converter is configured to determine a value for the third voltage based on the duty cycle of the output control signal received from the buck controller.

2. The system of claim 1, wherein an alternating current (AC) voltage is input to the electromagnetic interference (EMI) filter, the AC voltage provided by an AC power source.

3. The system of claim 2,
   wherein the step-down transformer includes a primary winding and a secondary winding,
   wherein the primary winding includes a switch configured to control a number of windings on the primary winding, and
   wherein a control signal for the switch enables the switch to control the number of windings on the primary winding based on a value for the AC voltage.

4. The system of claim 2,
   wherein the step-down transformer includes a primary winding and a secondary winding,
   wherein the secondary winding includes a switch configured to control a number of windings on the primary winding, and
   wherein a control signal for the switch enables the switch to control the number of windings on the secondary winding based on a value for the AC voltage.

5. The system of claim 1, wherein the first voltage is a full-wave AC rectified voltage equal to a first voltage value and the second voltage is a lower AC rectified voltage equal to a second voltage value that is less than the first voltage value.

6. The system of claim 5, wherein the second voltage value is greater than the value for the third voltage.

7. The system of claim 1, wherein the step-down transformer functions as a safety isolation transformer.

8. The system of claim 1, wherein a first capacitor included on an input to the first power stage and a second capacitor included on an output of the first power stage determine an amount of AC ripple on the second voltage.

9. The system of claim 1, wherein the power delivery adapter controller is configured to receive the at least one input indicative of a requested voltage value from a USB Type-C port.

10. A method for providing an output voltage comprising:
    receiving an alternating current (AC) voltage from an AC power source;
    generating a first voltage based on the AC voltage, the first voltage being a full-wave rectified voltage;
    generating, by a first power stage, a second voltage based on the first voltage, the second voltage being a lower rectified voltage that is less than the first voltage;
    receiving, by a power delivery adapter controller, at least one input indicative of a requested voltage value;
    controlling, by the power delivery adapter controller, a switch that switches a resistor in and out of a feedback control circuit based on the received at least one input indicative of the requested voltage value;
    receiving, by a second power stage comprising a buck converter and a buck controller operatively coupled to the buck converter, the second voltage;

generating, by the feedback control circuit, a feedback control input based on the at least one input indicative of the requested voltage value;
controlling, by the buck controller, a duty cycle of an output control signal based on the feedback control input; and
generating, by the buck converter, the output voltage equal to the requested voltage value based on the received second voltage and the duty cycle of the output control signal received from the buck controller.

11. The method of claim 10, further comprising:
providing, by a USB Type-C port, the at least one input indicative of a requested voltage value.

12. The method of claim 11,
wherein the USB Type-C port implements a USB power delivery (PD) protocol, and
wherein the controlling of the switching of the switch is based on the USB PD protocol.

13. The method of claim 10, wherein generating a second voltage based on the first voltage includes:
providing a control signal to a switch included on a primary winding of a step-down transformer included in the first power stage, the control signal enabling the switch to control a number of windings on the primary winding based on a value for the AC voltage.

14. The method of claim 10, wherein generating a second voltage based on the first voltage includes:
providing a control signal to a switch included on a secondary winding of a step-down transformer included in the first power stage, the control signal enabling the switch to control a number of windings on the secondary winding based on a value for the AC voltage.

15. The method of claim 10, wherein generating a first voltage based on the AC voltage includes:
inputting the AC voltage to an electromagnetic interference (EMI) filter;
suppressing, by the EMI filter, noise included on the AC voltage;
inputting the noise-suppressed AC voltage to an AC rectifier bridge; and
outputting, by the AC rectifier bridge, the full-wave rectified voltage as the first voltage.

16. A power adapter comprising:
a rectifier;
a cable including a plug connected to an alternating current (AC) power source, the AC power source providing an AC voltage to the rectifier;
a power delivery adapter controller;
a multipurpose port;
a two-stage adapter circuit including a first power stage and a second power stage, the first power stage configured to receive a first voltage generated by the rectifier and based on the AC voltage, and configured to output a second voltage,
the second power stage comprising a buck converter and a buck controller operatively coupled to the buck converter and wherein the buck converter is configured to receive the second voltage and configured to convert the second voltage to a third voltage, and
the power delivery adapter controller configured to receive at least one input indicative of a requested voltage value from the multipurpose port and configured to provide at least one output; and
a feedback control circuit configured to provide a feedback control input to the buck controller, the feedback control input being based on the at least one output provided by the a power delivery adapter controller, the buck controller configured to control a duty cycle of an output control signal based on the feedback control input, wherein the at least one output provided by the a power delivery adapter controller controls a switch that switches a resistor in and out of the feedback control circuit, and wherein the buck converter is configured to determine a value for the third voltage based on the duty cycle of the output control signal received from the buck controller and to provide the third voltage to the multipurpose port.

17. The power adapter of claim 16, wherein the multipurpose port is a USB Type-C port that implements a USB power delivery (PD) protocol.

* * * * *